Oct. 4, 1966
R. H. MATHES
3,277,474
BEARING CORRECTOR
Filed Aug. 12, 1952
2 Sheets-Sheet 1
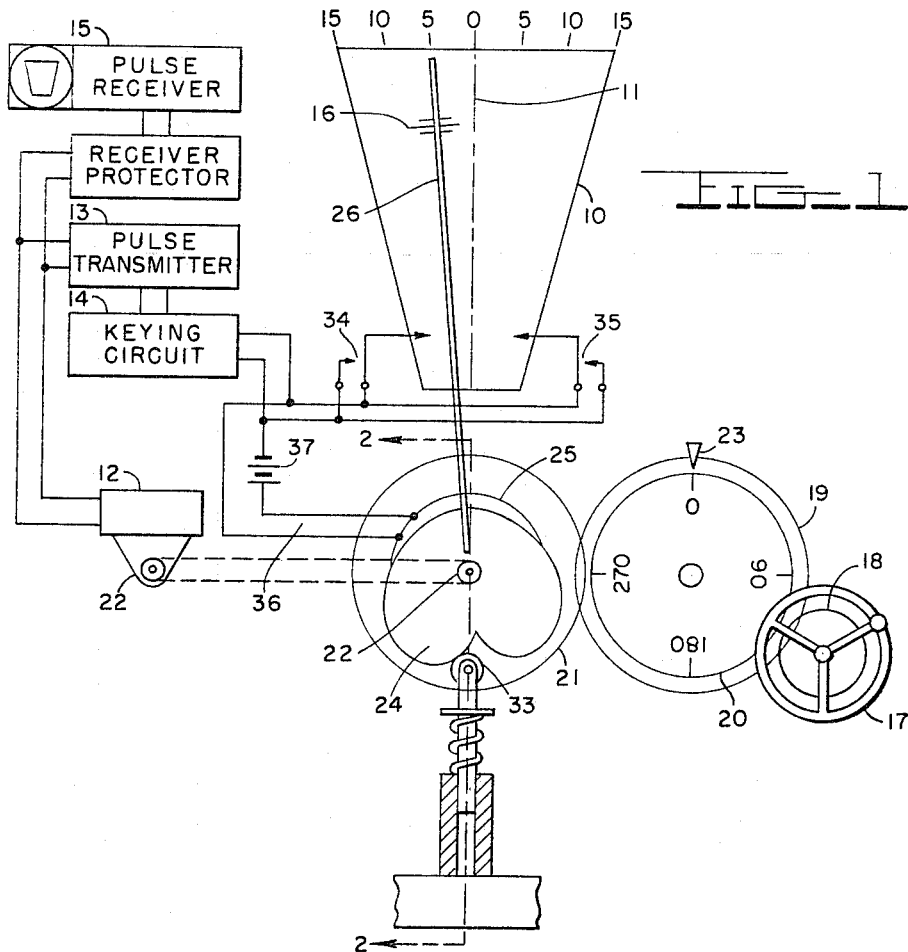
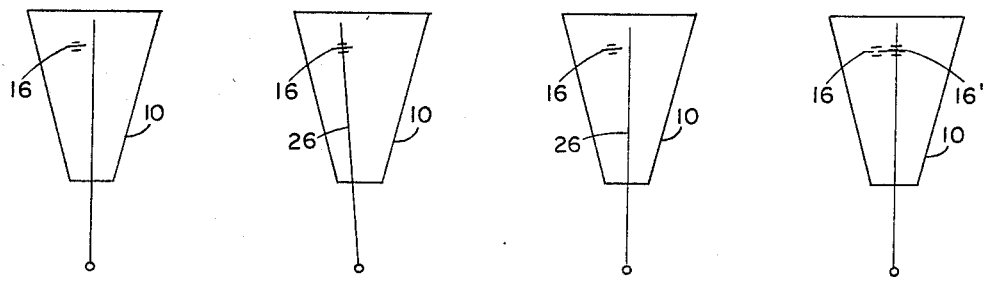
INVENTOR
ROBERT H. MATHES
BY
ATTORNEY Oct. 4, 1966  R. H. MATHES  3,277,474
BEARING CORRECTOR
Filed Aug. 12, 1952  2 Sheets-Sheet 2
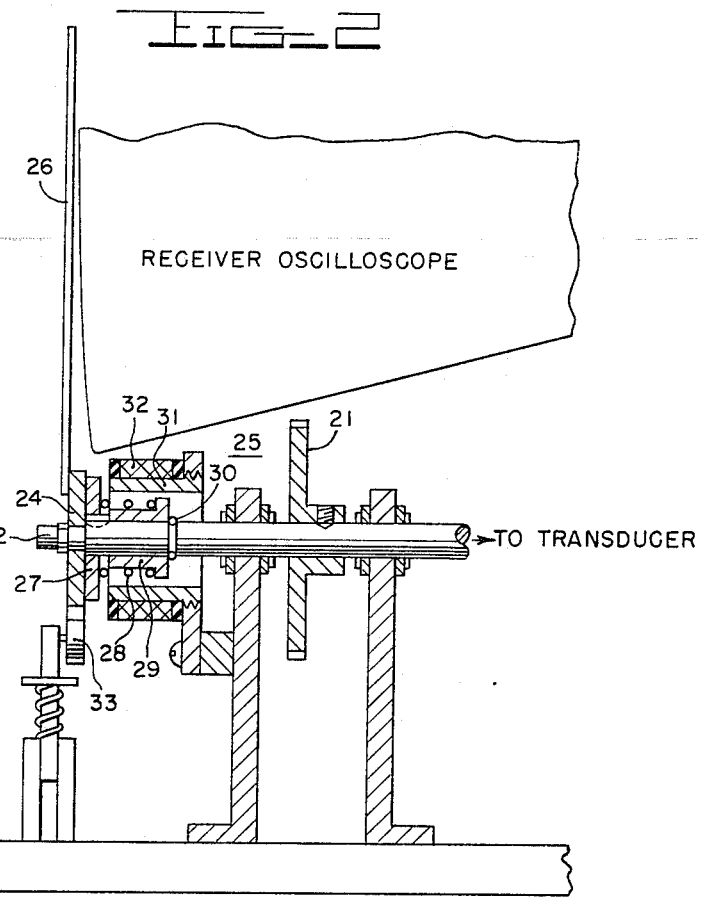
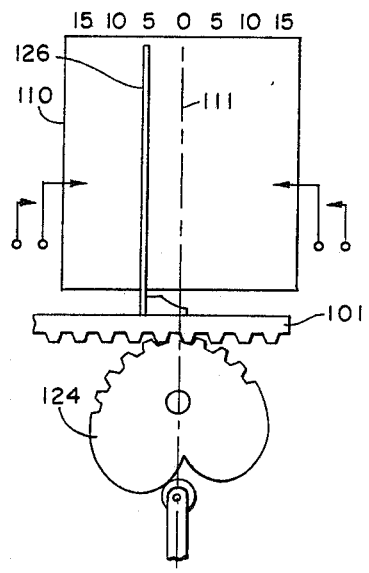
INVENTOR
ROBERT H. MATHES
BY
ATTORNEY ////
United States Patent Office 3,277,474
Patented Oct. 4, 1966

3,277,474
BEARING CORRECTOR
Robert H. Mathes, % Naval Research Laboratory,
Anacostia Station, Washington, D.C.
Filed Aug. 12, 1952, Ser. No. 304,047
9 Claims. (Cl. 343—16)

The invention described herein may be manufactured and used by or for the Government of the United States of America for governmental purposes without the payment of any royalties thereon or therefor.

The present invention relates to direction finding systems utilizing reception of wave energy from a reflecting or emitting object and more particularly to a system of the type in which a limited field or sector is scanned and the position of the object, relative to the sector scanned, indicated on the screen of a cathode ray oscilloscope or other suitable indicating device. Such systems are exemplified in the application of Robert M. Page, Serial No. 438,321, filed April 9, 1942, now Patent Number 2,660,721, for Radio Ranging Apparatus; the patent to I. Wolff No. 2,433,804 for Frequency-Modulated Pulse Radio Locating System, issued December 30, 1947; the patent to L. Bachelder 2,467,368, for Submarine Sound Detection Determining System, issued April 19, 1949, and the patent to O. H. Schuck No. 2,524,180, for Apparatus for Determining the Direction of Underwater Targets, issued October 3, 1950.

In systems of this type where the bearing of the object detected is indicated as deviating to the right or left of the field scanned, it is desirable to reposition or relocate the sector being scanned to bring the axis or center line of the sector to bear upon the object detected. Where there is appreciable time between appearance of successive indications as with the use of sound waves or with radio at low pulse repetition rate, successive adjustments must be separated by the pulse repetition interval which makes prompt adjustment and reduction in number of trial adjustments most desirable.

An object of the present invention is to provide a system enabling an operator to vary the direction or bearing of the sector being scanned to bring the axis or center line of the sector to bear on the reflecting or emitting object whose bearing as originally detected, was found to deviate from such center line, and to do this promptly and with a minimum of trial adjustments.

Another object is the provision of means whereby bearing deviation may be accurately compensated for through means mechanically aiding in the adjustment necessary to reorientate the sector being scanned to a position where the object detected will lie along the center line of the sector.

Various other objects and advantages of the invention will become apparent from a perusal of the following specification and the drawings accompanying the same.

In the drawings:

FIGURE 1 is a diagram of a bearing correction system embodying the present invention, applied to a sector shaped indication of the sector scanned;

FIGURE 2 is an axial section taken on the line 2—2 of FIGURE 1 showing a form of magnetic clutch which may be used in carrying out the invention;

FIGURES 3, 4, 5 and 6 constitute a group of diagrams illustrating four stages in a bearing correction;

FIGURE 7 is a diagram of the system applied to a rectangular coordinate representation of a sector being scanned.

Referring first to FIGURE 1, this illustrates the invention as applied to a sector scan system in which the sector being scanned is depicted on the screen of a cathode ray oscilloscope in substantially its true wedge shaped form. Here, an indicator in the form of wedge shaped field area 10 marked off directly on the screen of the oscillograph or on a transparent screen mounted thereover, bears a zero indicium 11 representing zero bearing relative to the line of direction or axis of the sector being scanned by the transducer 12. The transducer 12 for the present illustration is of the directional type capable of both transmission and reception. Other indicia at the top of the wedge shaped indicator field 10 indicate degrees of bearing deviation to either side of the zero bearing. A transmitter 13 controlled by a suitable keying circuit 14 transmits searching pulses of wave energy out through the transducer over the given sector being scanned. A receiver 15 receives echo pulses from reflecting objects in the area being scanned through the transducer for presentation as luminous spots such as the spot 16 on the cathode ray oscilloscope screen-area 10, at a location in the wedge shaped area corresponding to the location of the reflecting object in the field being scanned, all in any known or other suitable manner, such as in the known sector scan systems above referred to. Preferably the fluorescent screen of the oscilloscope is of the long persistent type of sufficient persistence to maintain a readily visible vestige of the brightened spot for several seconds after excitation.

Means such as a hand wheel 17 is provided for training the transducer on to different sectors to be scanned. The hand wheel 17 acts, for example, through a gear 18 turning in fixed relation with the hand wheel and meshing with an idler gear 19, the latter carrying the bearing card 20 and meshing with a transducer training gear 21, for driving the transducer training shaft 22. The gears 19 and 21 being of equal diameters rotate in opposite equal angular relation so that the indicia on the bearing card 20 registering with the fixed reference element 23 will indicate the relative bearing of the center line or axis of the field being scanned and represented on the wedge shaped area 10 of the oscilloscope screen. Thus when the hand wheel 17 is rotated counterclockwise the gear 21, and shaft 22 will be rotated counterclockwise through the idler 19 to train the transducer 12 counterclockwise or to the left. The bearing card 20 being carried by the gear 19 rotates to an equal angular extent but clockwise to bring under the stationary indicating element a bearing indicia indicating the degree of deviation of the axis of the sector being scanned.

A heart cam element 24 rotatably mounted on the shaft 22 but normally held in fixed relation to the shaft by a magnetic clutch element 25, carries a cursor vane 26 arranged to swing over the wedge shape field 10 on the oscilloscope screen as a radial element thereof in angular synchronism with the rotation of the shaft 22 and consequently in angular synchronism with the training movement of the transducer. The magnetic clutch element 25 may be of any known or other suitable form normally deenergized and operable, when energized to hold the heart cam in fixed relation to the shaft and when energized to release the heart cam and permit it to rotate freely. Such a clutch may be constructed along the general lines indicated in FIGURE 2. Here the heart cam 24 is mounted to rotate loosely on the shaft 22 when free but is normally held in fixed relation to the shaft by a friction clutch-disk 27 splined on the shaft and spring pressed against the heart cam by compression spring 28. The spring 28 is mounted on a loose flanged sleeve 29 against the flange of which the end of the spring remote from the clutch disk abuts, the sleeve in turn abutting a retaining C-clamp 30 on the shaft. A cylindrical magnet core 31 operates to become magnetized and attract the clutch-disk 27, away from the heart cam upon energization of its energizing magnet winding 32, the clutch-disk being formed from magnetic material and the heart cam of non-magnetic material for this purpose.

It will be understood that sticking or freezing together of the clutch-disk and magnet core element 31 after de-energization of the winding 32 may be prevented in any known or other suitable manner as by plating one or both with non-magnetic metal or by interposition of a layer of non-magnetic material not shown. It will also be understood that the shaft 22 may be operatively connected to the transducer either directly or indirectly for rotating the latter with rotation of the shaft in any known or other suitable manner as by flexible shaft, one-to-one gearing or suitable servo drive.

Biasing or tension means in the form of a spring pressed centering roller 33 (FIGURES 1 and 2) constrained to move in a straight vertical path operates in known manner to bring the heart cam 24 and cursor 26 to center position relative to the wedge shaped field 10 on the face of the oscilloscope. To avoid movement of the cursor beyond the limits of the wedge shaped field 10 by movement of the shaft 22, normally open limit switches 34 and 35 are provided at opposite sides of the field 10, said switches being operable by movement of the cursor thereagainst to close the energizing circuit 36 of the magnetic clutch 25 onto battery 37 as diagrammatically indicated in FIGURE 1.

This release circuit is also arranged to be closed momentarily by the keying circuit 14 upon each keying of the pulse transmitter 13 where sound or compressional waves are used, and where radio is used, a sufficient time in advance of the keying of the transmitter to permit clutch release and return of the cursor, before arrival of the echo. Where desired, either or both the clutch release circuit 36 and the pulse transmitter 13 may be keyed by hand in any known or other suitable manner.

In operation, assuming that the present bearing correction system is being used in an underwater sound system on a water craft, that the transducer 12 is directed forward to scan a sector forward of the craft, and that the clutch release circuit has been momentarily energized to restore the cursor 26 to central position as indicated diagrammatically in FIGURE 3, the bearing card 20 (FIGURE 1) will show the zero bearing indicium in register with the stationary reference indicium 23. Now, after a pulse has been transmitted, and upon receipt of a pulse echo causing appearance of a brightened spot 16 (FIGURE 3) on the sector field 10 of the oscilloscope say five degress deviation to the left of the center line of the sector field indicating the position of a reflecting object relative to the center line of the sector being scanned, the hand wheel is turned counterclockwise to train the transducer 12 and with it the cursor 26 to the left until the cursor lies directly across the brightened spot 16 as indicated in FIGURE 4. Synchronously the bearing card 20 is rotated clockwise the same angular extent, five degrees, to bring the bearing card to a position indicating the relative bearing of the transducer as 355 degrees, or five degrees to the left. Upon the next operation of the keying circuit 14 the transmitter 13 is keyed to transmit a second pulse and at the same time the clutch 25 is momentarily released permitting the heart cam and cursor 26 to return to center as indicated in FIGURE 5. Assuming that the relative position of the reflecting object and water craft bearing the direction finding system has not changed, the sector being scanned will have been rotated as a whole five degrees to the left with its center line bearing directly upon the reflecting target. Receipt of the next echo pulse from the same reflecting object now will cause a second brightened spot 16' to appear on the center line of the wedge shaped field 10 as indicated in FIGURE 6, the original brightened spot 16 persisting faintly as indicated in dotted lines.

Had the reflecting target and water craft moved relative to each other in the meantime, to move the relative bearing of the target to right or left of the center line of the new position of the sector being scanned, then the second brightened spot would appear to the right or left of the cursor, and the transducer 12 would again have to be trained to bring the cursor on to the second brightened spot.

Thus, without having to determine the degree of deviation from the presentation on the oscilloscope screen and then train the transducer a like degree, the necessary amount of training is accomplished directly and with mechanical precision by proceeding immediately with a training of the transducer to bring the cursor over the brightened spot which training moves the sector being scanned through an angle equal to the indicated deviation of the direction of the target from the center line or axis of the sector previously scanned.

Referring now to FIGURE 7, this shows schematically a modification of the invention applicable to use with any known or other suitable direction indicating system of a type presenting a rectangular coordinate representation of a sector being scanned. Here the cursor 126 takes the form of a vertical vane movable horizontally across the rectangular coordinate field 110. Lineal movement of the cursor in proportion to angular movement of the heart cam 124 is accomplished by means of a sliding rack element 101 on which the cursor is mounted, the rack being driven by a pinion element 102 formed on or otherwise carried by the heart cam 124 for rotation with the shaft 22. It will be understood that the remainder of the structure of this modification, not shown, is identical with that of the sector scan modification of FIGURES 1 and 2. Operation of the latter modification is similar in all respects to that of the former.

It will be understood further that the zero indicium 11 of FIGURE 1 or 111 of FIGURE 7, instead of being in the form of a center line, may be a dot or short line lying on the axis of the wedge shaped area 10, or at the center of rectangular area 110. In fact, the system is operable without the indicia inasmuch as the cursor 26 normally occupies the zero position and the operation of the system mechanically matches the training of the transducer with the dgree of deviation without necessity for a knowledge of the deviation expressed in angular degrees.

What is claimed is:

1. In an echo direction indicating system of a type having means for projecting a pulse of wave energy, a keying control element operable to initiate the propagation of a wave pulse, a trainable directional echo-receiving transducer, a cathode ray oscilloscope having a screen of the long persistance type, an indicium on said screen representing the directional axis of the transducer means responsive to the receipt of an echo by said transducer from a reflecting target to produce a luminous spot at a point on the face of the screen spaced from said axis indicium a distance corresponding to the bearing of the reflecting object relative to the directional axis of the transducer; the combination of a cursor pointer arm for the oscilloscope screen mounted to move across the face of the screen, biasing means tending to maintain the cursor in coincidence with said axis indicium, follower means movable in proportion to the training movement of the transducer, clutch means normally connecting the cursor with the follower means for moving the cursor across the face of the screen in direct proportion to the angular training movement of the transducer and means for releasing the clutch to permit the cursor to return to coincidence with the axis indicium under force of said biasing means independently of said follower and transducer, whereby a training movement of the transducer toward the target an amount necessary to bring the cursor over the luminous spot before receipt of a second echo pulse will bring onto the axis indicium the luminous spot resulting from the second echo pulse from the same location as the first echo pulse.

2. The combination as claimed in claim 1 together with means controlled by said keying control element for operating said releasing means.

3. The combination as claimed in claim 1 together with limit means operable upon movement of said cursor a given distance from said central indicium to operate said clutch release means.

4. In a target direction finding system having a target detecting means for detecting a target in a given sector, said detector means being trainable to cover different successive sectors, together with a target indicator including a cathode ray oscilloscope screen on which is indicated by spot brightening the position of a target relative to a reference axis of the sector covered by the target detecting means; the combination of a bearing corrector comprising a cursor movable over the screen for placement in overlapping relation with a target indication on the screen, biasing means tending normally to hold the cursor over a central portion of the screen representing the reference axis of the sector covered by the detecting means, means coupling the cursor with the detecting means for moving the cursor over the screen a distance proportional to the training movement of the detecting means, and means for momentarily releasing the coupling means to permit the cursor to move to the center position under force of the biasing means independently of the detecting means.

5. A target direction finding system and bearing corrector therefor as claimed in claim 4 in which the releasing means is controled by either one of a pair of control elements positioned at opposite ends of the cursor path of movement for actuation by the cursor upon arrival at either end of its path of movement.

6. In an echo direction indicating system of a type having means for scanning a definite sector for reception of an echo from a reflecting object within the sector scanned, means for varying the direction of the sector scanned, a cathode ray oscilloscope having a high persistance screen with an indicium on the screen representing the axis of the sector being scanned and means responsive to receipt of an echo from a reflecting object in the sector being scanned to produce a luminous spot on the screen at a point representing the bearing of the reflecting object relative to the axis of the sector scanned; the combination of a cursor for the oscilloscope screen mounted to move across the face of the screen, tension means tending to maintain the cursor in coincidence with the indicium representing the axis of the sector scanned, follower means movable with said direction varying means, clutch means normally connecting the cursor with the follower for moving the cursor across the screen with variation in direction of the sector scanned in fixed relation to the angular movement of the axis of the sector being scanned, and means for releasing the clutch to permit the cursor to return to the axis indicium under force of said tension means independently of the position of the sector being scanned and independently of said direction varying means, whereby variation in direction of the sector to bring the cursor over the luminous spot on the screen will place the axis of the sector being scanned through the position occupied by the reflecting object, so that after release of the clutch to permit the cursor to return to center position and with no relative movement between the object and the echo receiving means a subsequent echo from the same object will produce a luminous spot at a point on the screen at the indicium representing the axis of the sector scanned to indicate the object as lying directly on the axis of the sector scanned.

7. An echo direction indicating system as claimed in claim 6 with means for indicating the bearing of the axis of the sector being scanned relative to the position of the indicating system.

8. In a direction finding system of the type having a directional wave energy sensing means trainable to vary its line of directivity and an indicator bearing a zero indicium representing zero bearing relative to the line of direction of the directional sensing means and operable in response to receipt of wave energy from a given source to present a visual indication of the bearing of said source of wave energy relative to the line of direction of the directional sensing means; the combination of a bearing correction system comprising a cursor movable over the indicator, biasing means tending normally to hold the cursor over the zero indicium, motion transmitting means connecting the cursor and the trainable directional sensing means for moving the cursor over the indicator in response to a training movement of the sensing means a distance from the zero position representing the angular movement of the sensing means and in the same direction, and means for disconnecting said connecting means to permit the cursor to return to zero position under force of the biasing means independently of the position of the sensing means.

9. In a direction finding system having a direction finder element operable upon a given sector in space to produce an indicating mark on a surface element indicating the bearing of a target in the given sector relative to the bearing of the finder element, and means for training the finder element on different sectors; the combination of a cursor element movable over the said surface element, biasing means tending to hold the cursor over a portion of said surface element corresponding to a reference axis of the given sector, means connecting the cursor with the direction finder element for movement with the finder element, and means for releasing said connecting means to permit the cursor to return to its biased position independently of the position of the finder.

References Cited by the Examiner
UNITED STATES PATENTS

| | | | |
|---|---|---|---|
| 2,032,893 | 3/1936 | Settegast | 340—3 |
| 2,433,860 | 1/1948 | McDowell | 343—11 X |
| 2,585,855 | 2/1952 | Sherwin | 343—16 |
| 2,588,035 | 3/1952 | O'Neil | 343—10 |

CHESTER L. JUSTUS, *Primary Examiner.*

NORMAN H. EVANS, *Examiner.*

J. R. SPALLA, D. R. SMALL, R. D. BENNETT,
*Assistant Examiners.*